United States Patent [19]

Claude

[11] Patent Number: 4,906,060
[45] Date of Patent: Mar. 6, 1990

[54] APPARATUS AND METHOD FOR CONTROLLING THE OUTPUT FREQUENCY OF A WIND-DRIVEN ALTERNATOR

[75] Inventor: David L. Claude, Justin, Tex.

[73] Assignee: Twind Energy Corporation, Ridgewood, N.J.

[21] Appl. No.: 327,823

[22] Filed: Mar. 23, 1989

[51] Int. Cl.$^4$ .................... H02K 29/00; H02P 9/00
[52] U.S. Cl. ...................... 322/29; 322/32; 322/93; 290/44; 310/200; 318/502
[58] Field of Search .................. 322/10, 11, 29, 32, 322/40, 89, 90, 93, 35; 290/44, 55; 318/502, 369, 379; 310/200

[56] References Cited

U.S. PATENT DOCUMENTS

| | | | |
|---|---|---|---|
| 3,121,838 | 2/1964 | Mozic | 322/90 X |
| 3,200,324 | 8/1965 | Wagner | 322/32 |
| 3,404,326 | 10/1968 | Repke | 322/90 X |
| 3,694,731 | 9/1972 | Cherry | 322/29 X |
| 3,740,565 | 6/1973 | Wesley | 290/55 |
| 4,059,771 | 11/1977 | Jacobs et al. | 290/44 |
| 4,395,669 | 7/1983 | Berna et al. | 318/502 |
| 4,419,618 | 12/1983 | Gretsch | 322/29 X |
| 4,510,433 | 4/1985 | Gamze et al. | 322/32 |
| 4,511,807 | 4/1985 | Somerville | 290/44 |
| 4,585,950 | 4/1986 | Lund | 290/44 |
| 4,642,547 | 2/1987 | Redlich | 322/93 X |
| 4,656,413 | 4/1987 | Bourbeau | 322/35 X |

Primary Examiner—R. J. Hickey
Attorney, Agent, or Firm—Dennis T. Griggs

[57] ABSTRACT

Method and apparatus for controlling the output frequency of an alternator by maintaining a relatively constant speed of rotation of the alternator rotor are disclosed. The rotor includes an annular stator and a rotor rotatably mounted within. In one embodiment the stator winding is comprised of a plurality of discrete polyphase windings positioned within discrete annular segments of the stator. When the actual rotor speed is below the desired speed, selected stator units are de-energized to decrease the strength of the stator magnetic field, thereby permitting the rotor speed to increase. When the actual rotor speed is greater than the desired speed, selected stator units are energized to increase the strength of the stator magnetic field, thereby exerting a braking force on the rotor to slow it down. In another embodiment each phase of the polyphase stator winding includes a plurality of inductor coils. Selected ones of the coils in each phase of the stator winding are selectively energized to decrease the rotor speed or de-energized to increase the rotor speed, as required to maintain the desired rotor speed for substantially constant frequency output.

21 Claims, 3 Drawing Sheets

APPARATUS AND METHOD FOR CONTROLLING THE OUTPUT FREQUENCY OF A WIND-DRIVEN ALTERNATOR

FIELD OF THE INVENTION

The present invention relates generally to polyphase dynamoelectric machines, and in particular to a wind-driven alternator, the output frequency of which is proportional to the rotational speed of the alternator rotor.

BACKGROUND OF THE INVENTION

Electrical generators convert mechanical energy into electrical energy by rotating an electrical conductor (rotor) with respect to a relatively stationary magnetic element (stator), which produces an electric current in the rotor. Rotational motion may be imparted to the rotor by a variety of means, such as an electric motor, wind turbine or the like. Electrical generators can be used to generate both DC and AC current. Within the class of AC current generators, also known as alternators, is the so-called "polyphase" AC generator, in which both the stator and rotor are equipped with polyphase electrically conductive windings.

The output frequency of an alternator is proportional to the speed of rotation (RPM) of the rotor. For example, a three phase AC generator may require a rotor speed of 1800 RPM to generate a 60 Hz AC signal. Some electrical equipment which operates on AC current requires constant frequency (e.g. 60 Hz) for efficient operation. It is therefore critical to maintain a substantially constant rotor speed for constant frequency output. It is also critical to maintain a constant rotor speed to reduce wear and tear on mechanical components and for optimum operating efficiency of the machine. Machinery, such as electrical generators, are dynamically balanced to run most efficiently at one or more selected speeds of rotation.

Wind-driven propellers or turbines are often used to supply mechanical energy to turn the alternator rotor. One problem associated with such wind-driven machines is that wind speed variations will produce corresponding variations in the rotor speed and output frequency unless the rotor speed is otherwise regulated.

DESCRIPTION OF THE PRIOR ART

Conventional wind-driven alternators have a three-phase, wound rotor which constitutes the field. The stator is also wound in three phase and delivers the output current. Such wind-driven alternators are designed, typically, to drop off line when wind speeds fall below a certain threshold level, for example twelve miles per hour. The reason for this is that the mechanical governor cannot reliably maintain 1800 RPM below the threshold wind speed level, assuming average power loading. A constant 1800 RPM rotor speed is essential for the generation of output power at 60 Hz, which is the standard power frequency in the United States. Although the rotor will continue turning at lower speeds, and will produce power at such lower speeds, the frequency of the output current will drop below the standard 60 Hz, so that legally, it cannot be applied to domestic subscriber loads, and technically it could cause malfunctioning of loads such as electric motors which are intended to be operated at 60 Hz.

There are a variety of systems and methods known in the art for maintaining a relatively constant rotor speed in a wind-driven generator. One such system uses a speed control device which switches load resistors in and out of the output electrical circuit to maintain a relatively constant rotor speed, substantially independently of variations in wind speed. Still other systems use relatively complex circuitry for controlling the current excitation applied to the stator windings to achieve the desired output characteristics of the generator. In one such system the position of the rotor with respect to the stator at any given time is detected by optical sensors. A microprocessor is used to transmit timed control signals to selectively conduct current through the stator winding at predetermined times. This system requires complex electro-optical devices in order to control the excitation of the stator winding.

OBJECTS OF THE INVENTION

It is, therefore, the principal object of the present invention to provide an improved apparatus and method for maintaining a substantially constant rotor speed and output frequency in an electrical alternator.

Another object of the invention is to provide an improved system and method for controlling the excitation of selected portions of the stator winding in an alternator.

Still another object of the invention is to provide an improved system and method for controlling the rotational speed of a wind-driven generator, substantially independently of variations in wind speed.

A further object of the invention is to provide a relatively simple and economical apparatus and method for maintaining a constant rotor speed and output frequency in an electrical alternator.

SUMMARY OF THE INVENTION

The present invention is designed for use in a wind-driven alternator to produce 60 Hz power output at variable wind speeds substantially below the conventional threshold of twelve miles per hour.

This is accomplished by a wind-driven alternator in which three-phase, 60 Hz power is delivered by a three-phase wound rotor which rotates within a three-phase field produced by an articulated stator. The stator is "articulated" in the sense that multiple stator units are physically stacked and are wound separately, so that the magnetomotive force contribution of each stator can be added to the total electromotive force which produces the electromagnetic stator field which is magnetically coupled to the three-phase wound rotor.

Accordingly, when wind speed drops below a desired level, one or more stator units can be de-energized by disconnecting their separate windings, with field excitation being applied only to the separate stator windings which remain energized. The overall magnetic field produced by the separate stator windings appears as a mechanical load upon the wound rotor, thus imposing a magnetic braking force upon the rotor shaft.

If all stator units are disconnected, there is no magnetic brake effect, with only bearing frictional loads tending to limit rotor speed. The power output, however, is directly proportional to the number of stator units which are connected into the field excitation circuit. The compromise of trade-off effected by this system is a reduction of power output to maintain a constant RPM on the rotor shaft, which will produce a usable, 60 Hz power output, although it will be at a lower output level.

According to one aspect of the invention, the three-phase field excitation is determined by the magnitude of the rotor shaft RPM. An analog signal is developed by an RPM sensor coupled to the rotor shaft. This signal is compared with a 60 Hz reference signal.

The load control logic circuit evaluates the magnitude of the difference and generates a digital data word which corresponds with a unique, parallel combination of separate stator units for receiving the three-phase field excitation. Three-phase field excitation is applied to various combinations of stator windings through the address decoder/driver. According to this arrangement, the magnetic brake effect imposed by stator loading is automatically reduced and increased in steps, as rotor RPM decreases and increases with respect to a predetermined threshold level.

In an alternative embodiment, the stator is not articulated, but each phase group of the stator winding comprises multiple winding coils which are circumferentially spaced about a unitary stator core. Each winding coil within each phase group includes one or more turns, with the end turn portions of each coil being brought out at the end of the stator core. The coils of each phase group are separately energized so that the effective number of coil turns within each phase group can be increased or decreased incrementally. For example, in a stator core having 36 slots, each phase group comprises 12 separate coils, with each coil having multiple turns. As an additional coil is connected or disconnected, the magnetomotive force contribution is increased or decreased by about eight percent.

The apparatus according to the present invention is comprised of means for measuring the rotational speed of the rotor and for generating a first electrical signal indicative thereof; means for generating a second electrical signal representing a desired rotational speed of the rotor corresponding to a desired output frequency of the alternator; means for comparing the first and second electrical signals and for generating a third electrical signal when actual rotor speed is greater than desired rotor speed and for generating a fourth electrical signal when the actual rotor speed is less than the desired rotor speed; and control means responsive to the third electrical signal for enabling selected portions of the stator winding, thereby increasing the strength of the stator magnetic field to decrease the rotational speed of the rotor and to the fourth electrical signal for disabling selected portions of the stator winding to decrease the strength of the stator magnetic field and increase the rotational speed of the rotor.

In one embodiment the stator includes a plurality of discrete stator windings disposed on discrete annular segments of the stator. The control means is responsive to the third electrical signal for enabling selected ones of the stator windings to increase the strength of the stator magnetic field and is responsive to the fourth electrical signal for disabling selected ones of the stator windings to decrease the strength of the stator magnetic field.

In another embodiment the stator includes a plurality of electrical inductor coils is each phase of the polyphase stator winding. The control means is responsive to the third electrical signal for enabling selected ones of the coils in each phase of the stator winding to increase the strength of the stator magnetic field and is responsive to the fourth electrical signal for disabling selected ones of the coils in each phase of the stator winding to decrease the strength of the stator magnetic field.

In the preferred embodiment a tachometer is attached to the rotor for measuring the rotational speed thereof and for generating an analog signal indicative of the rotor speed at any given time. This analog speed signal, together with an analog reference signal indicative of the desired speed of rotation of the rotor, is fed into an analog comparator. The amplitudes of the two signals are compared and the comparator generates an analog signal indicative of the differential amplitude between the two input signals. For example, if the actual rotor speed exceeds the desired speed, the comparator will generate a positive analog signal, the amplitude of which is proportional to the amount by which the actual rotor speed exceeds the desired rotor speed. If, on the other hand, the actual rotor speed is less than the desired rotor speed, the comparator will generate a negative signal, the amplitude of which is proportional to the amount by which the actual rotor speed is less than the desired rotor speed.

The output of the comparator is fed into an analog-to-digital converter, wherein the amplitude differential is converted to a digital amplitude signal. Encoding circuitry is provided for converting the digital amplitude signals into corresponding control signals, each of which contains a discreté digital code representing the selected portion of the stator winding which is to be enabled or disabled, as the case may be. Driver means, which is preferably comprised of a decoder and a switching circuit, is responsive to the control signals for selectively applying an excitation signal to selected portions of the stator winding in response to a first set of control signals indicating that selected portions of the stator winding are to be energized and for disabling the excitation signal from being applied to selected portions of the stator winding in response to a second set of control signals indicating that selected portions of the stator winding are to be de-energized.

The apparatus and method according to the present invention provide a relatively simple and economical technique for maintaining a substantially constant output frequency in an electrical alternator by controlling the rotor speed. The invention is particularly suitable for use in connection with an alternator which is mechanically coupled to a wind turbine or the like in order to compensate for variations in the wind speed.

BRIEF DESCRIPTION OF THE DRAWINGS

Other objects and advantages of the invention will be apparent from the detailed description and claims when read in conjunction with the accompanying drawings wherein:

DETAILED DESCRIPTION OF THE PREFERRED EMBODIMENT

In the description which follows, like parts are marked throughout the specification and drawings, respectively. The drawings are not necessarily to scale and in some instances proportions have been exaggerated in order to more clearly depict certain features of the invention.

Figure 1:
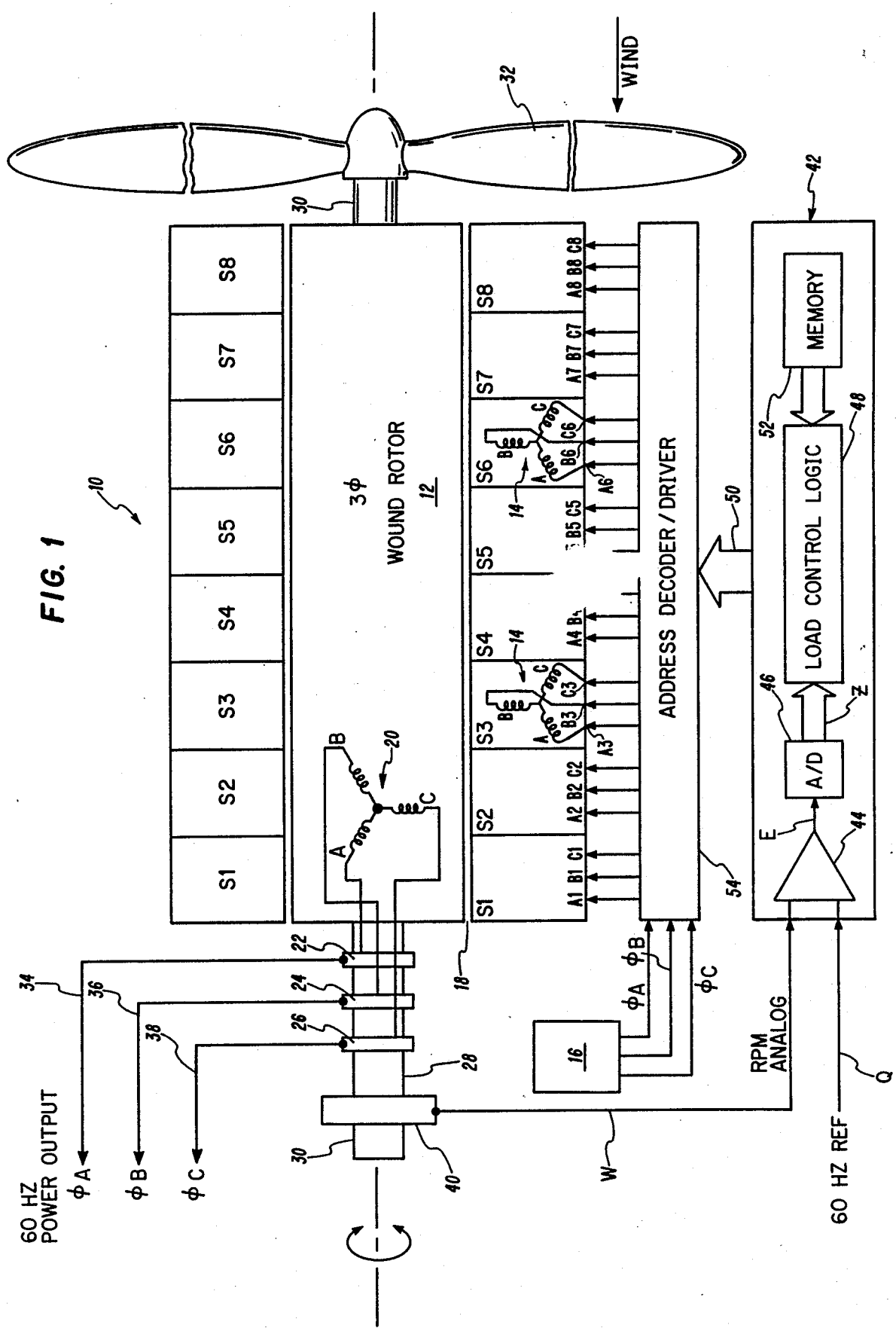
FIG. 1 is a schematic illustrating a first embodiment of an apparatus for controlling the rotor speed in a wind-driven alternator (shown in cross-section along the rotor axis), according to the present invention.

Referring to FIG. 1, a wind-driven electrical alternator is comprised of an annular stator 10 and a rotor 12, which is concentrically disposed within stator 10. Rotor 12 is journally supported for rotation with respect to stator 10. Stator 10 has a plurality of discrete three-phase windings 14 disposed thereon. Each winding 14 is disposed within a discrete annular segment S1–S8 on stator 10. Although eight windings are illustrated in FIG. 1, one skilled in the art will appreciate that the actual number of windings is a matter of design choice.

Each stator winding 14 has three separate winding phases, as indicated by phase coil groups A, B and C. The phase coil groups A, B and C are energized from a conventional 60 Hz three-phase alternating current supply 16 having three balanced output phases, $\phi A$, $\phi B$ and $\phi C$, which are displaced in time by 120 degrees. The flow of three-phase alternating current through one or more of the stator windings S1–S8 produces an alternating magnetic field in airgap 18 between stator 10 and rotor 12.

Rotor 12 has a symmetrical three-phase winding 20 disposed thereon, with separate phase windings A, B and C. Each phase winding A, B and C of rotor winding 20 is respectively connected to a slip ring 22, 24 and 26 on rotor shaft 28. One end of rotor 12 is coupled to a propeller shaft 30, on which a propeller 32 is mounted. Propeller 32 will spin around the axis of propeller shaft 30 in response to a force exerted on the propeller blades by the wind, to impart rotational motion to rotor 12. As rotor 12 rotates within stator 10, the electrically conductive rotor winding 20 will cut through the magnetic lines of flux established by stator windings 14 within airgap 18 to produce a three-phase alternating current in rotor winding 20. The magnitude of the current produced in rotor winding 20 will of course be dependent upon the strength of the stator magnetic field and the speed of rotation of rotor 12. The alternating electrical current generated in rotor winding 20 is transferred through rings 22, 24 and 26 to respective output conductors 34, 36 and 38, which are in turn connected to a power distribution panel or power grid.

In accordance with the present invention, the rotational speed of rotor 12 is maintained substantially constant, despite variations in wind speed, to maintain a constant frequency output signal, such as 60 Hz AC. The output frequency of the alternator is directly proportional to the rotational speed of rotor 12. In a three-phase alternator, rotor 12 spins at a speed of approximately 1,800 revolutions per minute (RPM) to produce a 60 Hz AC signal. The magnetic field created by the excitation of stator windings 14 acts as a brake to oppose the rotation of rotor 12. The greater the strength of the stator magnetic field, the greater will be the braking effect on rotor 12. By varying the strength of the stator magnetic field to compensate for changes in wind speed, a substantially constant rotor speed can be maintained to achieve the desired output frequency, even under relatively low wind speed conditions.

Referring to FIG. 1, rotor speed is controlled by selectively energizing and de-energizing one or more stator units S1–S8. A tachometer 40 is attached to rotor shaft 28 for measuring the speed of rotation thereof. Tachometer 40 sends an analog signal W proportional to rotor speed to a load control logic circuit 42. A stable analog reference signal Q corresponding to the desired rotor speed (1,800 RPM) to produce a 60 Hz output signal is also input to the logic circuit 42. Logic circuit 42 includes a differential amplifier 44 for producing an output signal E proportional to the difference of the RPM signal W and the reference signal Q.

If the amplitude of the RPM signal W exceeds the amplitude of the reference signal Q, the actual rotor speed is greater than the desired speed. The differential amplifier 44 will then generate a positive analog signal (+E), the amplitude of which is proportional to the difference between the two input signals. If, on the other hand, the amplitude of the RPM signal W is less than the reference signal Q, the actual rotor speed is less than the desired speed. The differential amplifier 44 will then generate a negative analog signal (−E), the amplitude of which is proportional to the difference between the two input signals.

The output E of the differential amplifier 44 is input to an analog-to-digital converter 46 within logic circuit 42, which converts the differential analog signal E to a digital data signal Z. A digital processor 48 is provided for encoding the digital amplitude signals into respective binary coded digital data control words 50 in accordance with a control program stored in a memory unit 52 in the digital processor. The control signals correspond with unique combinations of stator units S1–S8, the windings 14 of which are to be energized or de-energized, as the case may be.

By energizing additional stator units, the stator magnetic field is increased to increase the braking force on rotor 12, thereby reducing rotor speed when the actual rotor speed is greater than the desired speed. When fewer stator units are energized, the stator magnetic field is reduced, which reduces the braking force on rotor 14 and allows rotor 12 to spin faster when the actual rotor speed is less than the desired speed. If the actual rotor speed is substantially equal to the desired rotor speed, the differential amplifier 44 output E will be zero and a binary coded control signal 50 representative of a nominal combination of stator units S1–S8 will be generated.

The binary coded control signals are conducted, as indicated at 50, to an address decoder/driver circuit 54 wherein the binary coded control signals are decoded. The driver circuitry 54 includes groups of three power switches per stator unit (preferably power transistors or thyristors), each of which is connected to one of the phase conductors A, B and C of each particular stator winding 14, through power conductors A1, B1, C1, . . . , A8, B8, C8, respectively. After the control signals are decoded, an address signal is generated to turn on or turn off selected ones of power switches which are electrically coupled to the particular stator windings 14 which are to be energized or de-energized, as the case may be.

For example, if all the stator windings 14 are energized and the rotor speed falls below a threshold speed, logic circuit 42 will generate a control signal 50 which instructs address decoder/driver circuit 54 to de-energize stator windings 14 located in annular stator segments S1 and S8. The decoder circuitry will respond by turning off the power switches attached to phase conductors (A1, B1, C1) and (A8, B8, C8), thereby de-energizing the two stator windings 14 located in stator units S1 and S8. When the corresponding power switches are turned off, the electrical circuit between the corresponding phase conductors and excitation signal 16 will be opened, thereby de-energizing the corresponding windings 14. The strength of the stator magnetic field will be reduced, thereby permitting the rotor speed to increase.

If, for example, only two stator windings 14 in segments in S4 and S5 are energized and the actual rotor speed exceeds the desired speed, logic circuit 42 will generate a control signal 50 representing one or more additional stator windings 14 which are to be energized. If it is desired to energize the stator windings 14 in segments S3 and S6, decoder circuit 54 will send an address signal to the power switches coupled to the corresponding phase conductors of the two windings 14 in segments S3 and S6, thereby closing the corresponding switches and allowing excitation signal 16 to be applied to two stator windings 14 in stator units S3 and S6 in addition to stator units S4 and S5 to increase the strength of the stator magnetic field and slow the rotational speed of rotor 12.

One skilled in the art will appreciate that any one or more of the eight separate stator windings 14 can be energized or de-energized in combination at any given time to maintain a substantially constant rotor speed.

The wind speed may become excessive such that the actual rotor speed exceeds the desired rotor speed, despite the fact that all the stator windings 14 are energized. In this event, rotor speed is limited by a mechanical governor (not shown) interposed between propeller 32 and rotor 12 to limit the speed of rotor 12 during high wind conditions. Such control devices are known in the art and typically include means for aerodynamically braking the rotor. One method of aerodynamically braking the rotor is by varying the pitch of the propeller in the conventional manner.

Figure 2:
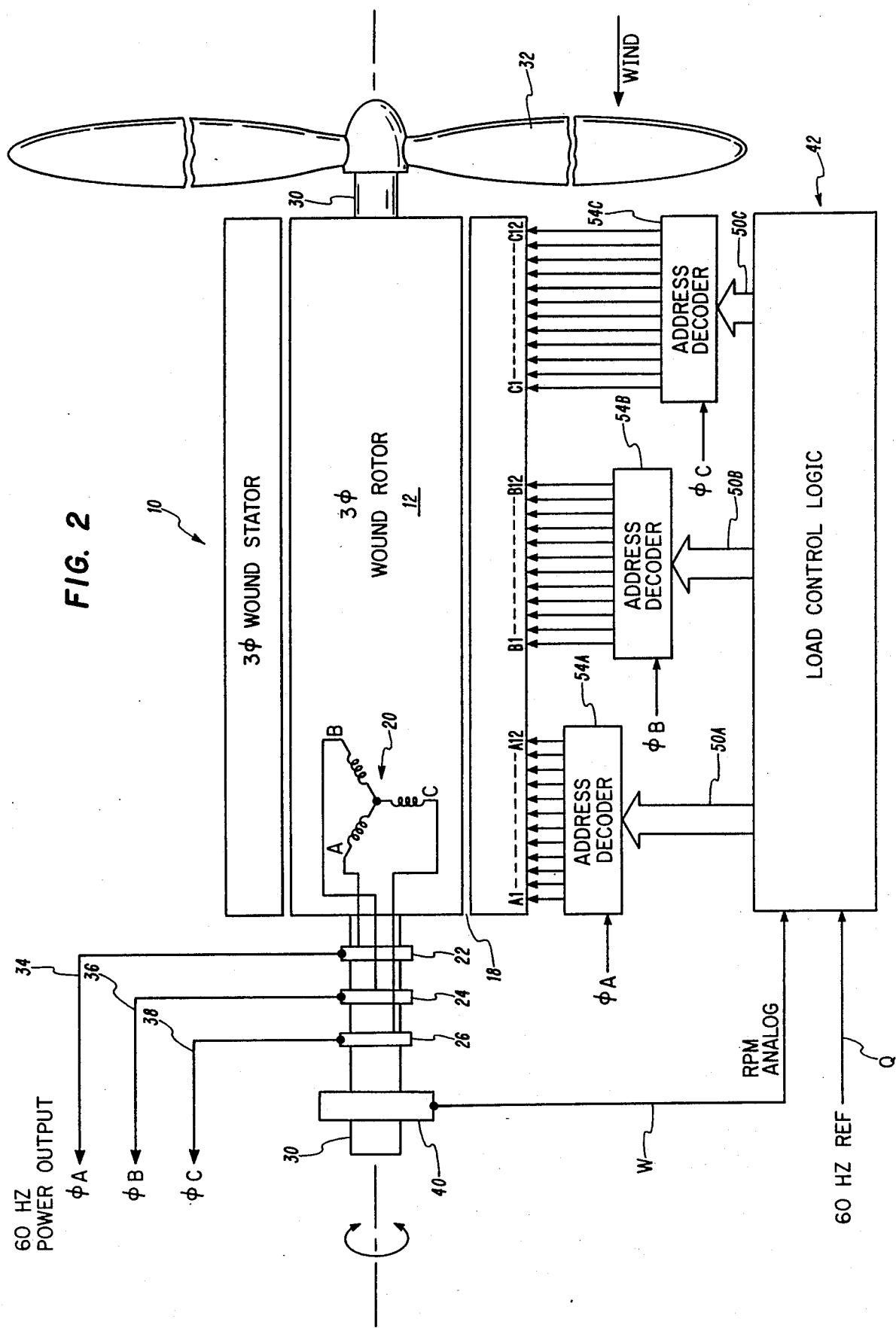
FIG. 2 is a schematic illustrating a second embodiment of an apparatus for controlling the rotor sped in a wind-driven alternator (shown in cross-section along the rotor axis), according to the present invention; and, FIG. 3 is an electrical circuit diagram illustrating the excitation of selected coil groups within the stator winding, according to the second embodiment of the present invention, as shown in FIG. 2.
Figure 3:
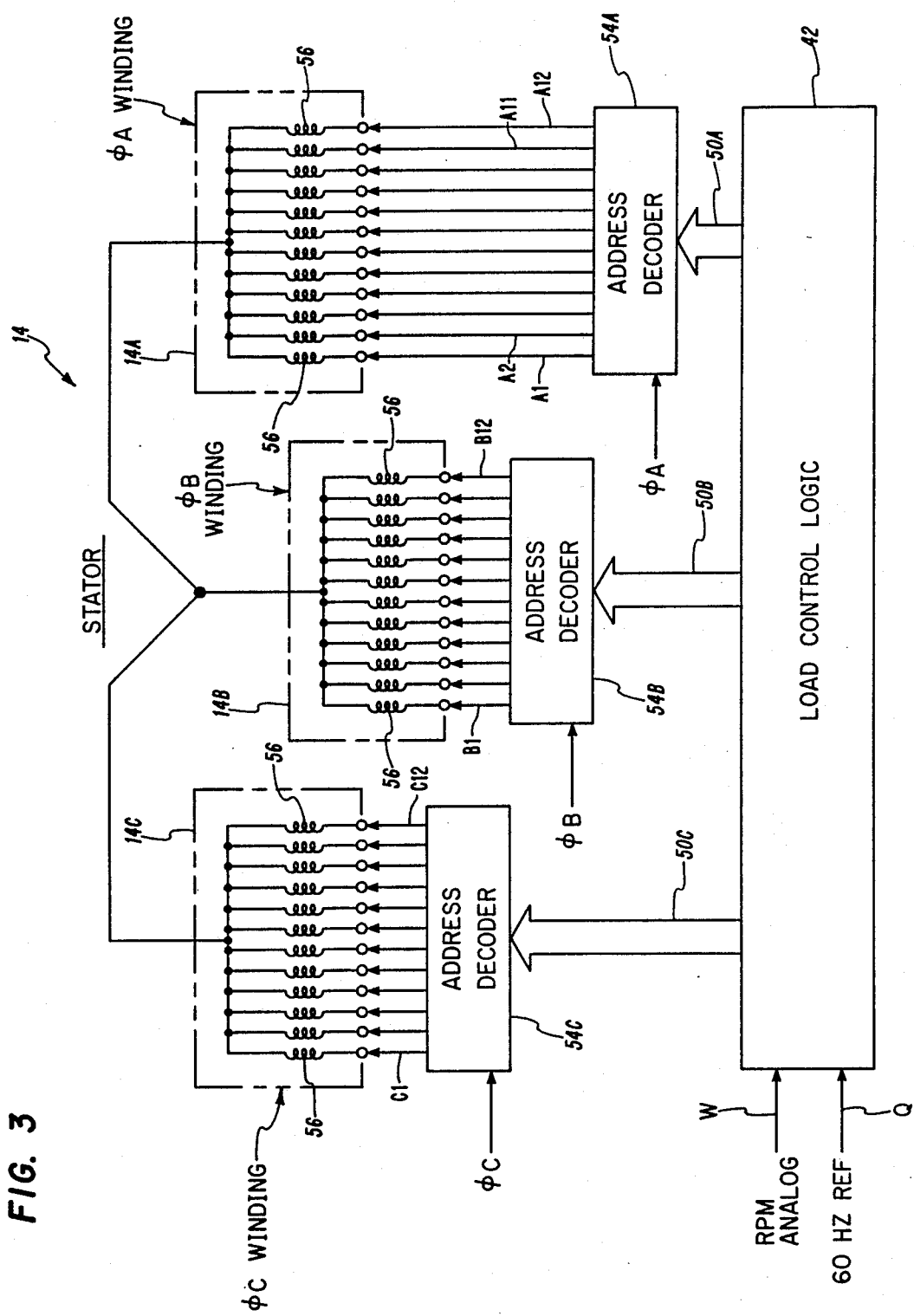

Referring to FIGS. 2 and 3, an alternate embodiment of the invention is depicted. In this alternate embodiment stator 10 has a distributed three-phase winding 14 instead of separate winding groups S1–S8 as in the embodiment shown in FIG. 1. Each stator phase winding 14A, 14B and 14C is comprised of a plurality of electrical inductor coils 56, each of which is electrically coupled through conductors A1–A12, B1–B12 and C1–C12 to a particular power switch within driver circuitry 54A, 54B, 54C, respectively. In this configuration, one or more individual coils within each phase of stator winding 14 are selectively energized and de-energized to increase or decrease the strength of the stator magnetic field to maintain constant rotor speed. The binary coded control signals 50A, 50B, 50C produced by load control logic circuit 42 correspond with unique combinations of one or more coils 48 within each phase of stator winding 14 which are to be energized or de-energized as determined by load control logic circuit 42.

For purposes of example only, the number of coils 56 in each phase winding is shown to be twelve. One skilled in the art will appreciate that the number of coils in each phase winding may be a number other than twelve. Instead of selectively energizing and de-energizing all of the coils in selected ones of a plurality of separate stator winding 14 (as in the embodiment shown in FIG. 1), one or more individual coils 56 within each phase group ($\phi$A, $\phi$B, $\phi$C) of a three-phase symmetrical winding 14 are selectively energized and de-energized. Otherwise, the system and method for controlling the speed of rotor 12 is essentially the same as described above with reference to FIG. 1.

The system and method for controlling rotor speed in a three phase alternator according to the present invention provides a relatively simple and economical system for maintaining a substantially constant frequency output. Electrical power is conserved by eliminating the need for dump resistors and the like, which drain off excess power in many types of conventional alternators. In accordance with the present invention the output current of the alternator varies in response to variations in the stator magnetic field in order to maintain a constant output frequency despite variations in the wind or other source of mechanical energy.

Various embodiments of the invention have now been described in detail. Since changes in and modifications to the above-described preferred embodiment may be made without departing from the nature, spirit and scope of the invention, the invention is not to be limited to said details except as set forth in the appended claims.

What is claimed is:

1. An apparatus for controlling the output frequency of an electrical alternator, said alternator having a stator and a rotor rotatably mounted with respect to stator, said stator and said rotor having respective polyphase electrically conductive windings disposed thereon, said apparatus comprising:
   means for measuring the rotational speed of said rotor and for generating a first electrical signal indicative thereof;
   means for generating a second electrical signal representing a desired rotor speed corresponding to a desired output frequency of said alternator;
   means for comparing said first and second electrical signals and for generating a third electrical signal when actual rotor speed is greater than the desired rotor speed and for generating a fourth electrical signal when actual rotor speed is less than the desired rotor speed; and,
   control means responsive to said third electrical signal for enabling selected portions of said stator winding, thereby increasing the strength of the stator magnetic field to decrease the rotational speed of the rotor, said control means being responsive to said fourth electrical signal for disabling selected portions of said stator winding, thereby decreasing the strength of the stator magnetic field to increase the rotational speed of the rotor.

2. The apparatus according to claim 1 wherein said stator winding is comprised of a plurality of discrete stator windings disposed at predetermined positions on said stator, said control means being responsive to said third electrical signal for enabling selected ones of said stator windings and being responsive to said fourth electrical signal for disabling selected ones of said stator windings and being responsive to said fourth electrical signal for disabling selected ones of said stator windings.

3. The apparatus according to claim 2 wherein said plurality of said stator windings are disposed on discrete annular segments of said stator.

4. The apparatus according to claim 1 wherein said stator includes a plurality of electrical inductor coils in each phase of said polyphase stator winding, said control means for enabling selected ones of said coils in each phase of said stator winding in response to said third electrical signal and for disabling selected ones of said coils in each phase of said stator winding in response to said fourth electrical signal.

5. The apparatus according to claim 2 further including means for generating a polyphase alternating current excitation signal, for being applied to selected portions of said stator winding.

6. The apparatus according to claim 5 wherein said control means is comprised:
   processing means for generating respective first and second sets of control signals, each control signal of said first set having a discrete digital code representing a selected portion of said stator winding which is to be enabled and each control signal of said second set having a discrete digital code representing a selected portion of said stator winding which is to be disabled; and,
   driver means for decoding the first and second sets of control signals, said driver means for enabling said excitation signal to be applied to selected portions of said stator winding in response to a corresponding one of said first set of control signals and for disabling said excitation signal from being applied to selected portions of said stator winding in response to a corresponding one of said second set of control signals.

7. The apparatus according to claim 6 wherein said third and fourth electrical signals are analog signals indicating the differential amplitude between the respective amplitudes of said first and second electrical signals, said processing means including analog-to-digital converter means for converting said third and fourth electrical signals to corresponding digital amplitude signals and encoding means responsive to said digital amplitude signals for generating corresponding ones of said first and second sets of control signals.

8. The apparatus according to claim 7 wherein said driver means includes switching means for electrically connecting and disconnecting said excitation signal to selected portions of said stator winding in response to the corresponding control signals generated by said processing means.

9. The apparatus according to claim 5 wherein said stator winding and said rotor winding are each comprised of respective three-phase symmetrical windings.

10. The apparatus according to claim 1 wherein said means for measuring the rotational speed of said rotor is comprised to tachometer means which generates an analog signal indicative of actual rotor speed at any given time.

11. An electrical alternator, comprising:
   a stator having a polyphase electrically conductive stator winding disposed thereon;
   a rotor rotatably mounted with respect to said stator, said rotor having a polyphase electrically conductive rotor winding disposed thereon;
   means for measuring the rotational speed of said rotor and for generating a first electrical signal indicative thereof;
   means for generating a second electrical signal representing a desired rotor speed corresponding to a desired output frequency of said alternator;
   means for comparing said first and second electrical signals and for generating a third electrical signal when actual rotor speed is greater than the desired rotor speed and for generating a fourth electrical signal when actual rotor speed is less than the desired rotor speed; and,
   control means responsive to said third electrical signal for enabling selected portions of said stator winding, thereby increasing the strength of the stator magnetic field to decrease the rotational speed of the rotor, said control means being responsive to said fourth electrical signal for disabling selected portions of said stator winding, thereby decreasing the strength of the stator magnetic field to increase the rotational speed of the rotor, so that the rotational speed of the rotor is maintained at substantially the desired rotational speed for substantially constant frequency output.

12. The alternator according to claim 11 further including means for supplying mechanical energy to turn said rotor.

13. The alternator according to claim 11 wherein said means for supplying mechanical energy is comprised of a wind-driven impeller rotatably mounted on a shaft member coupled to said rotor, said impeller being responsive to a force imparted thereto by the wind to rotate said shaft member and said rotor.

14. The alternator according to claim 10 wherein said stator includes a plurality of discrete stator windings disposed at selected positions on said stator, said control means being responsive to said third electrical signal for enabling selected ones of said stator windings and being responsive to said fourth electrical signal for disabling selected ones of said stator windings to maintain the desired speed of rotation of said rotor.

15. The alternator according to claim 10 wherein said stator includes a plurality of electrical inductor coils in each phase of said polyphase stator winding, said control means for enabling said selected ones of said coils in each phase of the stator winding in response to said third electrical signal and for disabling selected ones of said coils in each phase of said stator winding in response to said fourth electrical signal, to maintain the desired speed of rotation of said rotor.

16. The alternator according to claim 10 further including means for generating a polyphase alternating current excitation signal, for being applied to selected portions of said stator winding.

17. The alternator according to claim 16 wherein said control means is comprised of:
   processing means for generating respective first and second sets of control signals, each control signal of said first set having a discrete digital code representing a selected portion of said stator winding which is to be enabled, each control signal of said second set of control signals having a discrete digital code representing a selected portion of said stator winding which is to be disabled; and,
   driver means for decoding said first and second sets of control signals, said driver means for enabling said excitation signal to be applied to a selected portion of said stator winding in response to a corresponding one of said first set of control signals and for disabling said excitation signal from being applied to a selected portion of said stator winding is response to a corresponding one of said second set of control signals.

18. The alternator according to claim 17 wherein said driver means includes switching circuit means for electrically connecting and disconnecting said excitation signal to selected portions of said stator winding in response to the corresponding control signals generated by said processing means.

19. A method of controlling the output frequency of an electrical alternator, said alternator having a stator and a rotor rotatably mounted with respect to said stator, said stator and said rotor having respective polyphase electrically conductive windings disposed thereon, said method comprising the steps of:
- measuring the rotational speed of said rotor and generating a first electrical signal indicative thereof;
- generating a second electrical signal representing a desired rotational speed of said rotor corresponding to a desired output frequency of said alternator;
- comparing said first and second electrical signals and generating a third electrical signal when the amplitude of said first electrical signal is greater than the amplitude of said second electrical signal and generating a fourth electrical signal when the amplitude of said second electrical signal is greater than the amplitude of said first electrical signal, the respective amplitudes of said third and fourth electrical signals being proportional to the amplitude difference between said first and second electrical signals;
- selectively enabling selected portions of said stator winding in response to said third electrical signals, thereby increasing the strength of the stator magnetic field to decrease the rotational speed of the rotor; and,
- selectively disabling selected portions of said stator winding in response to said fourth electrical signal, thereby decreasing the strength of the stator magnetic field to increase the rotational speed of the rotor, so that the rotor speed is maintained at substantially the desired speed for substantially constant frequency output.

20. The method according to claim 19 further including the step of generating a polyphase alternating current excitation signal, for being applied to selected portions of said stator winding to energize said selected portions when said third electrical signal is generated.

21. The method according to claim 20 wherein the steps of enabling and disabling selected portions of said stator winding is comprised of the following steps:
- generating a first set of control signals in response to said third electrical signal, each control signal of said first set containing a discrete digital code representing a selected portion of said stator winding which is to be energized;
- selectively generating a second set of control signals in response to said fourth electrical signal, each control signal of said second set having a discrete digital code representing a selected portion of said stator winding which is to be de-energized;
- decoding said first and second sets of control signals and selectively electrically connecting said excitation signal to a selected portion of said stator winding in response to a corresponding one of said first set of control signals to energize said selected portion of said stator winding and selectively electrically disconnecting said excitation signal from a selected portion of said stator winding in response to a corresponding one of said second set of control signals to de-energize said selected portion of said stator winding in response to a corresponding one of said second set of control signals.

* * * * *

UNITED STATES PATENT AND TRADEMARK OFFICE
CERTIFICATE OF CORRECTION

PATENT NO. : 4,906,060
DATED : 03/06/90
INVENTOR(S) : David L. Claude

It is certified that error appears in the above-identified patent and that said Letters Patent is hereby corrected as shown below:

Column 3, line 63, "is" should be -- in --.

Column 4, line 62, "sped" should be -- speed --.

Column 9, line 10, "comprised:" should be -- comprised of: --.

Column 9, line 50, "to" should be -- of --.

Signed and Sealed this

Eighth Day of January, 1991

Attest:

HARRY F. MANBECK, JR.

*Attesting Officer*  Commissioner of Patents and Trademarks